United States Patent [19]
Speakman

[11] 3,716,527
[45] Feb. 13, 1973

[54] PROCESS FOR PRODUCING FORMALDEHYDE-TREATED STARCH FREE OF UNREACTED OR FREE FORMALDEHYDE

[75] Inventor: Edwin L. Speakman, Clinton, Iowa
[73] Assignee: Standard Brands Incorporated, New York, N.Y.
[22] Filed: Oct. 22, 1971
[21] Appl. No.: 191,816

[52] U.S. Cl. ...260/233.3 A, 260/233.3 R, 260/233.5
[51] Int. Cl. ............................................C08b 19/01
[58] Field of Search ......260/233.3 A, 233.5, 233.3 R

[56] References Cited
UNITED STATES PATENTS 3,549,618   12/1970   Speakman.........................260/233.3

Primary Examiner—Donald E. Czaja
Assistant Examiner—Melvyn I. Marquis
Attorney—Aaron B. Karas et al.

[57] ABSTRACT

The invention is directed to a process for producing a formaldehyde-treated starch. A material which provides ammonium or amine groups is provided in a slurry of formaldehyde-treated starch containing free or unreacted formaldehyde at a pH of above about 6.5. The material combines with the free or unreacted formaldehyde and thus reduces vaporization of the formaldehyde.

9 Claims, No Drawings

PROCESS FOR PRODUCING FORMALDEHYDE-TREATED STARCH FREE OF UNREACTED OR FREE FORMALDEHYDE

THE INVENTION

This invention relates to an improved process for producing a formaldehyde-treated starch.

It is known in the art that the properties of starch may be altered by treating the same with formaldehyde. It is generally assumed that formaldehyde reacts with starch under acidic conditions to cross-link the starch granules.

The prior art methods of treating starch with formaldehyde may be generally classified into two broad classes. The first, and perhaps the one of principal importance to the starch industry, is treating starch with formaldehyde under conditions such that the treated starch requires slightly more rigorous conditions for pasting than does the starch prior to the formaldehyde treatment. The uses of such treated starches vary widely. For instance, the treated starches may be used for sizing of paper, textiles and as adhesives. Typical processes for producing such formaldehyde-treated starches are disclosed, for example, in U. S. Pat. No. 3,360,512, to Moore and U. S. Pat. No. 2,113,034, to Rowland et al.

The other broad class of treating starch with formaldehyde includes preparing a formaldehyde-treated starch under such conditions as to obtain a starch product which is highly cross-linked. These cross-linked starch products tend not to disperse in water and maintain their granular characteristics even at high temperatures in the presence of relatively high concentrations of moisture. A typical process for preparing these products is disclosed in U. S. Pat. No. 2,417,611, to Pierson. A specific use for such starch products is as a dusting powder, for instance as surgical dusting powder.

Although processes for preparing formaldehyde-treated starches vary depending upon the properties desired in the starch product, generally formaldehyde and starch are reacted in an aqueous slurry in the presence of a mineral acid catalyst. Usually, it is convenient to employ formaldehyde in the form of the polymer, for instance, paraformaldehyde, since it is a solid material and convenient to handle. In such a process, a water slurry containing the starch and paraformaldehyde is prepared, and an acid is added to adjust the pH to cause reaction between the starch and formaldehyde.

The amount of formaldehyde required is dependent upon a number of variables, such as the pH of the slurry, the length of time that the reaction is allowed to proceed, the temperature at which the reaction is carried out, the starch concentration of the slurry, and, of course, the properties desired in the product. When a granular starch product is desired, the reaction must be carried out below temperatures which will gelatinize the starch. Temperatures in the range of from about 118° to about 130° F are suitable for this purpose. Higher temperatures may be employed when gelatinization inhibitors are present, such as NaCl and the like.

Preferably, the reaction is carried out in a starch slurry having a concentration of from about 16° to about 22° Baume' (28 per cent to 39 per cent starch on a dry solids basis). The pH during the reaction may be in the range of from about 1.7 to about 2.5 and the paraformaldehyde concentration may be in the range of from about 0.25 to about 5 per cent, based on the dry substance starch. The reaction time depends upon the viscosity characteristics desired, and may be in the range of from about 3 to 15 hours.

When the reaction has proceeded to the desired extent, sufficient alkali is added to terminate the reaction. This occurs at a pH of above about 3. The treated starch product can be separated from the slurry by conventional means. These may include sieving the slurry to remove non-starch materials and filtering, for instance on a vacuum drum filter. The starch product may then be dried at conventional starch drying temperatures, for example at air temperatures of from about 160° to 300° F. Depending upon the starch concentration of the slurry, it is sometimes advisable to dilute the slurry prior to the sieving thereof so as to effect an increased flow rate through the sieve. Because of the temperatures employed to effect reaction of the starch with formaldehyde, the starch slurry during this separation process may be at relatively high temperatures, for instance above ambient temperature to about 130° F.

In commercial production of formaldehyde-treated starch, generally, there will be present after the reaction of formaldehyde and starch, unreacted or free formaldehyde. This formaldehyde is extremely undesirable because of its tendency to volatilize at low temperatures. This presents potential health hazards to those who are present in the vicinity of the separation process and to those who are present during the use of such a starch product. Even at extremely low concentrations, volatilized formaldehyde is irritating.

U. S. Pat. No. 3,549,618, to Speakman discloses a method wherein sulfites, bisulfites and hydrosulfites are used to eliminate free or unreacted formaldehyde from formaldehyde-treated starch. Although this method has solved the problem commonly associated with preparing formaldehyde-treated starch, there are a number of problems associated therewith. These include economics and potential pollution problems. For instance, due to the salts formed by using the sulfites and because it is desirable to remove at least a major portion of the same from the formaldehyde derivatives of starch, these soluble salts increase the burden on sewage disposal facilities. In the method of the present invention not only is free or unreacted formaldehyde eliminated from formaldehyde-treated starch, but a much lesser amount of reaction byproducts are formed, thus decreasing the burden on sewage disposal facilities.

The method of the present invention is accomplished by providing in an aqueous slurry of formaldehyde-treated starch at a pH of above about 6.5 containing unreacted or free formaldehyde a material which solubilizes to yield ammonium or amine groups which react at a pH of above about 6.5 with the free or unreacted formaldehyde to substantially reduce vaporization of the same.

The term "starch" includes all raw starches, e.g., corn, tapioca, wheat, waxy sorghum, waxy maize, grain sorghum, rice and the like, and various modified starches and derivatives of starches, e.g., thin-boiling starches, oxidized starches, starch ethers, starch esters and the like, the only requirement being that the starch contain free hydroxyl groups.

The material which provides ammonium or amine groups may be incorporated into the aqueous slurry of formaldehyde-treated starch in any convenient manner. When the formaldehyde-starch reaction has been completed, it is preferred to incorporate this material into the slurry after the slurry has been made alkaline. The pH of the slurry must be above about 6.5 for reaction to occur between the free formaldehyde and the ammonium or amine groups. The pH should not be so high as to damage or gelatinize the starch granules. The typical pH range within which the reaction is effected is from about 7 to below about 11.5 The preferred pH, however, is in the range of from about 7.5 to about 9.5. The preferred material used in the present method is ammonium hydroxide.

Any base or substance which in water solution will decompose to yield a base may be used to adjust the pH of the formaldehyde reaction slurry to above about 6.5. The preferred base is sodium carbonate because of economics and ease of handling. If the material used to provide ammonium or amine groups is sufficiently basic, it may also be employed to raise the pH of the reaction slurry to above about 6.5. Any combination of bases may be used for the pH adjustment.

The amount of material used to provide ammonium or amine groups in the formaldehyde-starch reaction slurry is preferably sufficient to react substantially stoichiometrically with the free or unreacted formaldehyde. If this material is also used to adjust the pH of the reaction slurry to above about 6.5 then more material must be provided to effect reaction with the free or unreacted formaldehyde.

After the free or unreacted formaldehyde is eliminated, it is generally necessary to lower the pH of the slurry to a range of from about 3.5 to about 8.0. The reason for lowering the pH of the slurry to within this range is that the user of the formaldehyde-treated starch generally prefers starch products within this pH range and these pH's are normal to the industry.

In order to more clearly describe the nature of the present invention, specific examples will hereinafter be described. It should be understood, however, that this is done solely by way of example, and is intended neither to delineate the scope of the invention nor limit the ambit of the appended claims. In the example and throughout this specification, percentages are intended to refer to per cent by weight, unless otherwise specified.

EXAMPLE I

A corn starch slurry containing 35.5 per cent dry basis starch was heated to 129° F, acidified with muriatic acid to a pH of 1.5 and 0.8 per cent paraformaldehyde added based upon the starch solids present. The slurry was maintained under these conditions for about 5 hours and then neutralized to a pH of about 7 with a $Na_2CO_3$ solution. 77.8 per cent ammonium hydroxide, based on the weight of the paraformaldehyde, was added to the slurry. The pH of the slurry was 8.8. The slurry was stirred for two hours and then the pH was lowered to 4.0 by the addition of muriatic acid. The slurry was filtered on a rotary vacuum filter to recover the formaldehyde-treated starch. The starch cake was washed on the filter and dried in a Proctor & Schwartz drier at an air temperature of 200° F. No formaldehyde odor was detected during the separation, drying or evaluation of the product. Also, the viscosity characteristics of the product were unaffected by the ammonium treatment.

EXAMPLE II

This Example illustrates the effect of pH of an aqueous slurry of formaldehyde on elimination of unreacted or free formaldehyde.

A corn starch slurry containing 39.09 per cent dry basis starch was heated to 129° F, acidified with muriatic acid to a pH of 1.5 and 0.8 per cent paraformaldehyde added based upon the starch solids present. The slurry was maintained, with stirring, under these conditions for 1 hour and then the pH of the slurry was adjusted to 4.0 by the addition of a $Na_2CO_3$ solution. Sufficient ammonium chloride was added to the slurry to provide a concentration of 1.31 per cent based on the dry basis starch present. The slurry was divided into 6 portions and the pH of the portions adjusted by the addition of a $Na_2CO_3$ solution to the values shown in Table I below. The slurries were stirred for about 17 hours and then the odor of the slurries was determined.

TABLE I

Odor of Aqueous Slurries of Formaldehyde- Treated Starch at Various pH Levels

| Slurry | pH to which slurry was Initially Adjusted | pH of Slurry After 17 Hours | Observations |
|---|---|---|---|
| A | 4.0 | 3.8 | Strong formaldehyde odor |
| B | 5.5 | 4.3 | Strong formaldehyde odor |
| C | 6.5 | 5.4 | Slight formaldehyde odor |
| D | 7.0 | 6.6 | Extremely slight formaldehyde odor |
| E | 7.5 | 7.7 | No formaldehyde odor |
| F | 8.5 | 8.5 | No formaldehyde odor |

The pH's of the above slurries were adjusted to 5.6 with a solution of sodium carbonate or muriatic acid, as required, and filtered. The odor of the filter cakes was determined. The results are shown in Table II.

TABLE II

Odor of Filter Cakes of Formaldehyde-treated Starch

| Filter Cake | Observations |
|---|---|
| A | Strong formaldehyde odor |
| B | Strong formaldehyde odor |
| C | Strong formaldehyde odor |
| D | Strong formaldehyde odor |
| E | No formaldehyde odor |
| F | No formaldehyde odor |
|   | No formaldehyde odor |

The wet filter cakes were then dried in a laboratory model Proctor & Schwartz drier at an air temperature of 180° F and the odor of the hot exhaust air determined. The results are shown in Table III.

TABLE III

Odor of Hot Exhaust Air From Drying Formaldehyde-treated Starch

| Filter Cake | Observations |
|---|---|
| A | Strong formaldehyde odor |
| B | Strong formaldehyde odor |
| C | Strong formaldehyde odor |
| D | Slight formaldehyde odor |

| | |
|---|---|
| E | No formaldehyde odor |
| F | No formaldehyde odor |

From the above, it is apparent that in order to reduce or eliminate the vaporization of unreacted or free formaldehyde from formaldehyde-treated starch, the pH of above about 6.5 is necessary.

The terms and expressions which have been employed are used as terms of description and not of limitation, and it is not intended to exclude any equivalents of the features shown or described or portions thereof, since it is recognized that various modifications are possible within the scope of the invention claimed.

What is claimed is:

1. A process for producing a formaldehyde-treated starch comprising reacting starch and formaldehyde in an aqueous slurry under conditions whereby unreacted or free formaldehyde is present in the slurry, adjusting the pH of the slurry from above about 6.5 to below a level where gelatinization of the starch occurs and providing in the slurry a sufficient amount of a material which solubilizes to yield ammonium or amine groups which react at a pH of above 6.5 with the unreacted or free formaldehyde to substantially reduce the vaporization thereof.

2. A process for producing a formaldehyde-treated starch as defined in claim 1, wherein the pH of the slurry is maintained in the range of from above about 7 to below about 11.5 during the reaction of the ammonium or amine groups with the unreacted or free formaldehyde.

3. A process for producing a formaldehyde-treated starch as defined in claim 2, wherein the pH of the slurry is maintained in the range of from about 7.5 to about 9.5 during the reaction of the ammonium or amine groups with the unreacted or free formaldehyde.

4. A process for producing a formaldehyde-treated starch as defined in claim 2, wherein the material provided in the aqueous slurry is ammonium hydroxide.

5. A process for producing a formaldehyde-treated starch as defined in claim 3, wherein the material provided in the aqueous slurry is ammonium hydroxide.

6. A process for producing a formaldehyde-treated starch as defined in claim 4, wherein after the ammonium groups have reacted with the formaldehyde the pH of the slurry is lowered to the range of from about 3.5 to about 8.

7. A process for producing a formaldehyde-treated starch as defined in claim 6, wherein the starch and formaldehyde are reacted at a pH within the range of from about 1.7 to about 2.5 and the pH of the slurry is adjusted to above about 7 by the addition of sodium carbonate.

8. A process for producing a formaldehyde-treated starch as defined in claim 2, wherein the material provided in the aqueous slurry is an ammonium salt.

9. A process for producing a formaldehyde-treated starch as defined in claim 8, wherein the material provided in the aqueous slurry is ammonium chloride.

* * * * *